Feb. 4, 1969 R. E. CAIRNS 3,425,176
ADHERED WINDSHIELD WITH CONCEALED ADHERENT
Filed July 7, 1967
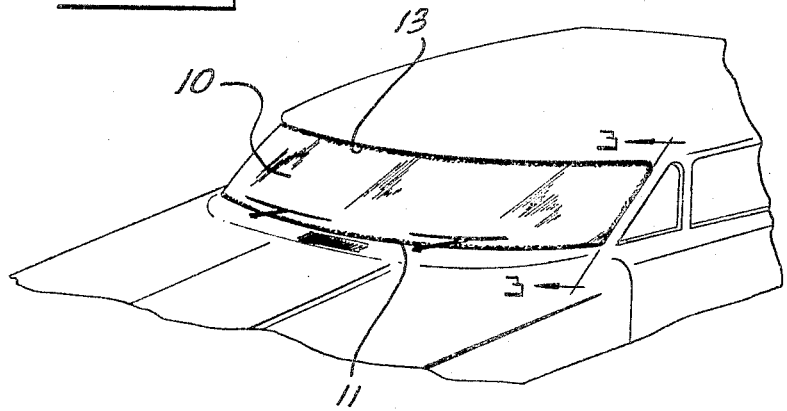
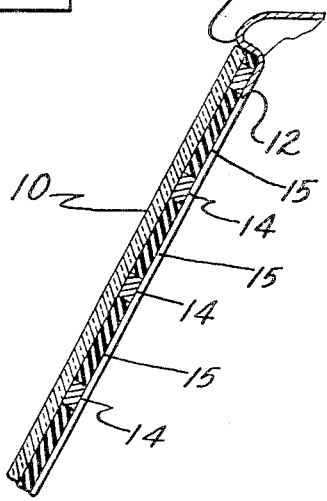
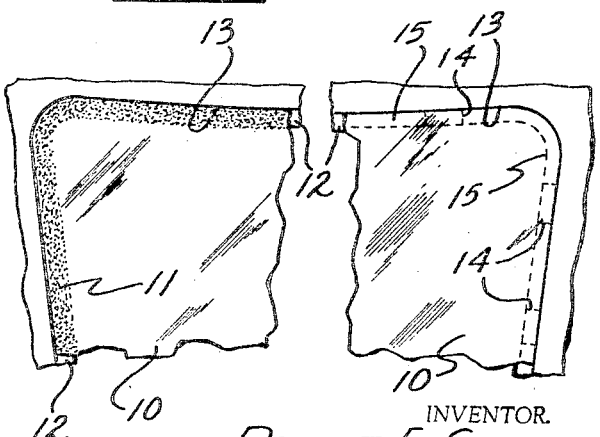
INVENTOR.
ROBERT E. CAIRNS
BY William J. Farrington
AGENT 3,425,176
ADHERED WINDSHIELD WITH CONCEALED ADHERENT
Robert Edward Cairns, East Longmeadow, Mass., assignor to Monsanto Company, St. Louis, Mo., a corporation of Delaware
Filed July 7, 1967, Ser. No. 656,618
U.S. Cl. 52—208
Int. Cl. B60j 1/02, 3/00; E06b 3/24
5 Claims

ABSTRACT OF THE DISCLOSURE

This disclosure relates to a novel glazing unit for use in vehicles, building construction, etc., which eliminates the need for wide cumbersome moldings in order to conceal the substructure and mounting means. This disclosure provides a glazing unit with an aesthetic appearance which minimizes the glare commonly caused by wide shiny metal molding strips. The glazing unit comprises a glass panel adhered to a sub-structure and an opaque border on the panel concealing the adherent.

DESCRIPTION OF THE PRIOR ART

Glazing units mounted in metal channels or to metal substructures using spacers, sealants, clamps, shock absorbing pads or strips are commonly known in the prior art. Examples of these may be found in vehicular glazing units especially windshields, rear windows, and other windows of the non-roll away type and in building construction, e.g., stores, office buildings, residences, etc. A major problem associated with structures of this type is that the substructure and mounting means are visible even to the casual observer and present an unsightly appearance. In order to overcome these defects, craftsmen have resorted to using wide molding strips to conceal the structure.

SUMMARY OF THE INVENTION

The present invention provides a novel glazing unit having an opaque or a translucent-border which is formed as an integral part of the glazing material itself which conceals unsightly substructures and/or mounting means thereby eliminating the need for wide molding strips. In addition, the present invention provides a decided safety advantage by eliminating a source of glare while still providing an aesthetic function.

As pointed out above, wide molding strips are commonly used with glazing units in order to conceal unsightly substructures. However, certain drawbacks are associated with their use. The wide chrome metal type moldings commonly used in vehicle glazing units and in building construction on or near roads carrying heavy traffic may be a source of bright reflectors or glare thereby creating a safety hazard. In order to eliminate this safety hazard and to provide more aesthetic designs a trend is developing in automotive design where the molding around the periphery of the out-board side of the windshield is being made narrower and narrower. This is creating the problem of devising means of obscuring the edges of the metal frame or opening into which the windshield is inserted, as well as the mounting system which usually comprises adhesives, sealants, spacers, used to hold the windshield in place.

The present invention solves the foregoing problems by providing glazing units having an opaque or translucent border or edge which will conceal the metal substructure and mounting means without creating possible new sources of rain leaks, rattles or glare.

It is an object of this invention to provide novel glazing units.

It is another object of this invention to provide novel glazing units having an opaque or translucent border or edge which will eliminate the need for wide molding strips heretofore used to cover unsightly substructures and mounting means.

The means by which the foregoing objects are accomplished can be readily understood by reference to the following description and to the attached drawings.

FIGURE 1 illustrates a glazing unit of the present invention which is mounted as a windshield in an automobile.

FIGURE 2 illustrates the glazing unit shown in FIGURE 1 in an unmounted condition.

FIGURE 3 is a cross-sectional side view taken along lines 3—3 in FIGURE 1 and illustrates a typical construction used in mounting glazing units in vehicle bodies.

FIGURE 4 is a partially cutaway front view of a glazing unit mounted in a vehicle which illustrates how the opaque or translucent border serves as a substitute for a molding strip to cover the unsightly substructure and the mounting means for the glazing unit.

For purposes of the description set forth herein the expression opaque when used in reference to the border or edge portion of the glazing unit also includes translucent borders or edges. The terms are to be construed to be interchangeable and are used to mean that under ordinary conditions of light a casual observer is unable to see the details of the substructure or the mounting means for the glazing unit through this opaque and/or translucent border or edge portion.

The expression glazing unit refers to a pellucid panel which is mounted or assembled as a window and includes windshields, side lights and rear lights, domes, etc. in vehicles and the conventional windows in residences and commercial buildings.

The pellucid panels may be glass or clear rigid plastic materials such as polymethylmethacrylate, polyvinyl chloride, polystyrene, etc. The pellucid panels may be single sheets or laminated construction, wherein in the latter, a clear plastic sheet is interposed between adjacent panels.

Examples of plastic interlayers commonly used in the art include polyvinyl butyral, polycarbonate, polyurethane and polysulfide resins. The glass used may be any glass commonly used in window construction, including flat glass, polished glass, laminated glass, tempered glass, semi-tempered glass, etc.

The term substructure refers to the base where the glazing unit is mounted. In its broad sense it also includes the mounting means and adjuncts referred to above.

Referring in greater detail to the drawings, FIGURE 1 shows a laminated glazing unit, 10, having an opaque border, 11, which is mounted as a windshield in an automobile. It should be noted that this invention is not limited to glazing units used as windshields. The glazing units described in this invention are also suitable for use as rear windows and/or side windows, in vehicles such as automobiles, trains, planes, or they may be used as glazing units in buildings and other related construction.

In general they may be used in any of those applications where molding strips are commonly used to cover the unsightly substructure or mounting means generally associated with the installation of a glazing unit to a metal base.

FIGURE 2 shows a detached or unmounted glazing unit, 10, having a border which may be opaque or translucent. The particular glazing unit shown has a curvature which is commonly found in the so-called wrap-around window of modern vehicles. However, it should be apparent to one skilled in the art that the concept of the present invention may be used with flat or plane glazing units as well as with the single or double glazing units commonly used in modern automobile windshields.

FIGURE 3 is a cross-sectional view of a mounted glazing unit taken along lines 3—3 of FIGURE 1 illustrating a typical sub-construction used in the mounting of glazing units in vehicles. The glazing unit itself, 10, which in this illustration is a laminated safety glass having a polyvinyl butyral interlayer, is mounted on the rear mounting rim, 12, which usually is formed by a base part of the vehicle itself. Interposed between the glass and the mounting rim are resilient spacers, 14, which are used to keep the normally fragile glass off of the metal rim and to align the glass evenly around the mounting rim as well as to cushion the glass. A sealant, 15, is commonly used both to insulate the unit and seal it against the weather and may also serve to cushion it against shocks. Also shown is an outer rim, 13, which is that part of the vehicle which forms a periphery around the glazing unit. It should be noted that the particular construction illustrated is merely set forth as being typical and many various mounting schemes and methods are possible and may be actually encountered in the art. FIGURE 3 clearly illustrates the unsightly substructure which must be concealed if an aesthetic appearance is to be provided in the glazing unit.

FIGURE 4 is a partial cutaway front view of a typical glazing unit commonly found in automobile windshields. FIGURE 4 illustrates the unsightly substructure showing the rear mounting rim, 12, the spacers, 14, and the sealant, 15, which are commonly used or associated with typical glazing unit installation in vehicles. The glazing unit in the right hand portion of the drawing does not contain the opaque border of the present invention and consequently the unsightly substructure is readily visible through the glass presenting an unaesthetic appearance. On the other hand, the left hand portion of the drawing illustrates an opaque border of the present invention which conceals the unsightly substructure and obviates the need for a wide molding strip which would normally be used to conceal the substructure.

The pellucid panels used as the glazing unit in the present invention may be of any type commonly associated with glazing units as was pointed out above.

The opaque border or edge of these pellucid panels may be formed on either or both sides of the panel by a surface treatment of these edges.

Alternately, the pellucid panels may be formed in such a manner as to have the opaque characteristic permeate through the thickness of the panel.

In general, the border may be formed on the pellucid panels by any one of several methods.

In one embodiment the panel to be treated may be covered with a template in the center portions leaving those edge portions, wherein the border is to be formed, uncovered. The uncovered edge of the panel is then treated by sandblasting with an abrasive material which would cause the formation of a translucent or an opaque effect on the surface of the glass at the edge while maintaining the clarity of those portions of the sheet.

Alternately the opaque characteristics may be imparted to the edge or border zone by mechanical abrasion such as with wheels, brushes, files, etc.

In another embodiment, the edge of the panel may be treated with a material which would etch or otherwise change the surface characteristics of the treated edge portion thereby forming an opaque or border portion. In the event that the panel is a glass sheet, the edge or border portion may be treated with hydrogen fluoride which would etch the glass to cause an opaque effect in those untreated zones. When the panel whose edges are to be treated is a synthetic resin, the panel may be opacified by treating the edge or border with materials such as solvents and/or acids or bases which would induce an opaque effect onto the treated zone.

Alternately, one may achieve an opaque effect in the edge or border portions of the panel by incorporating pigments or fillers into the desired zones during the formation of the panel. Means such as these may be employed in panels so as to achieve an opaque or translucent effect. An example of the product of these means is frosted glass.

These and other methods for producing an opaque or translucent border on a pellucid panel will become apparent to those skilled in the art in view of the foregoing description.

The width of the opaque border on the panel will vary with the intended end use for a given type of construction. In general, the width of this opaque portion should be sufficient to conceal the substructure. This concealment will usually be to the same extent as that achieved using the wide molding strips of the prior art. In many types of construction, a molding strip may be still required on the in-board surface of the panel especially in construction where a unitary panel, either a single sheet or a laminate is to be used as opposed to those double pane insulation type glazing units. Thus, in unitary construction the opaque border on the glazing unit may be conveniently of such a width so that the edge of the opaque border is congruent with the edge of the interior molding strip.

Another embodiment calls for tinting the opaque border with a color that blends in with structure wherein the glazing units of this invention are installed. Conversely, where the border effect is to be accented, a contrasting color may be used. In vehicle glazing units, a glare-reducing eye-resting green or blue tint may be used.

This invention also contemplates partial opaque borders which may extend only around certain areas of the glazing unit. For example, an automobile windshield may only need the opaque border on the top of the windshield or on the top and the two sides. This choice of border will, of course, depend on many factors not the least of which are the type of installation and the end effect desired.

For certain applications the edge of the opaque border toward the center of the glazing unit may be a straight line, scalloped or of any convenient geometric design.

As stated above, the present invention will allow the use of narrow or bead type molding strips around glazing units which will minimize the glare caused by wide moldings while still concealing unsightly substructures. Furthermore, tinted opaque borders may provide additional safety features by reducing eye-strain for those looking out through the glazing unit.

Optionally, the present invention may serve to eliminate shiny metal moldings entirely. In this embodiment the opaque border masks the substructure and mounting means while a non-glare producing bead or strip, which is fabricated from rubber or other similar material is used to cover the exposed edges of the glazing unit and/or the substructure in which the glazing unit is mounted.

From the foregoing description it will be readily apparent to those skilled in the art that the opaque borders of the glazing units of this invention may be produced in any variety of colors, widths, designs, etc. The substructure and mounting means may be conveniently any of the known substructures or mounting means which are well known to those skilled in the art.

It should be readily apparent that many variations or modifications may be made in the present invention without departing from the spirit and scope thereof.

What is claimed is:

1. A windshield assembly for a vehicle comprising a substructure surrounding an opening in the body of the vehicle and a safety-glass panel disposed within the opening and being secured to the substructure solely by means disposed between the substructure and the surface of the panel contiguous thereto; said safety-glass panel comprising a glass sheet having on the periphery thereof an opaque border concealing the substructure and the means used to secure the safety-glass panel to the substructure.

2. The windshield assembly of claim 1 wherein the safety-glass panel is laminated safety-glass.

3. The windshield assembly of claim 2 wherein the laminated safety-glass contains a polyvinyl butyral interlayer.

4. The windshield assembly of claim 1 wherein the opaque border extends partially around the periphery of the safety-glass panel.

5. The windshield assembly of claim 1 wherein the opaque border extends completely around the periphery of the safety-glass panel.

References Cited

UNITED STATES PATENTS

| | | | |
|---|---|---|---|
| 1,785,696 | 12/1930 | Hackett et al. | 52—616 |
| 1,877,336 | 9/1932 | Lovell et al. | 52—616 |
| 2,937,407 | 5/1960 | Richardson | 156—100 |
| 2,999,337 | 9/1961 | Sharp | 52—616 |
| 3,288,666 | 11/1966 | Dacey | 161—5 |
| 3,354,025 | 11/1967 | Aykanian | 161—100 |
| 3,387,416 | 6/1968 | Martin | 52—208 |

HENRY C. SUTHERLAND, *Primary Examiner.*

U.S. Cl. X.R.

52—311, 475, 616; 296—97